Jan. 27, 1942.  L. M. GOLDSMITH  2,271,336
BEARING MOUNTING
Filed Nov. 27, 1940
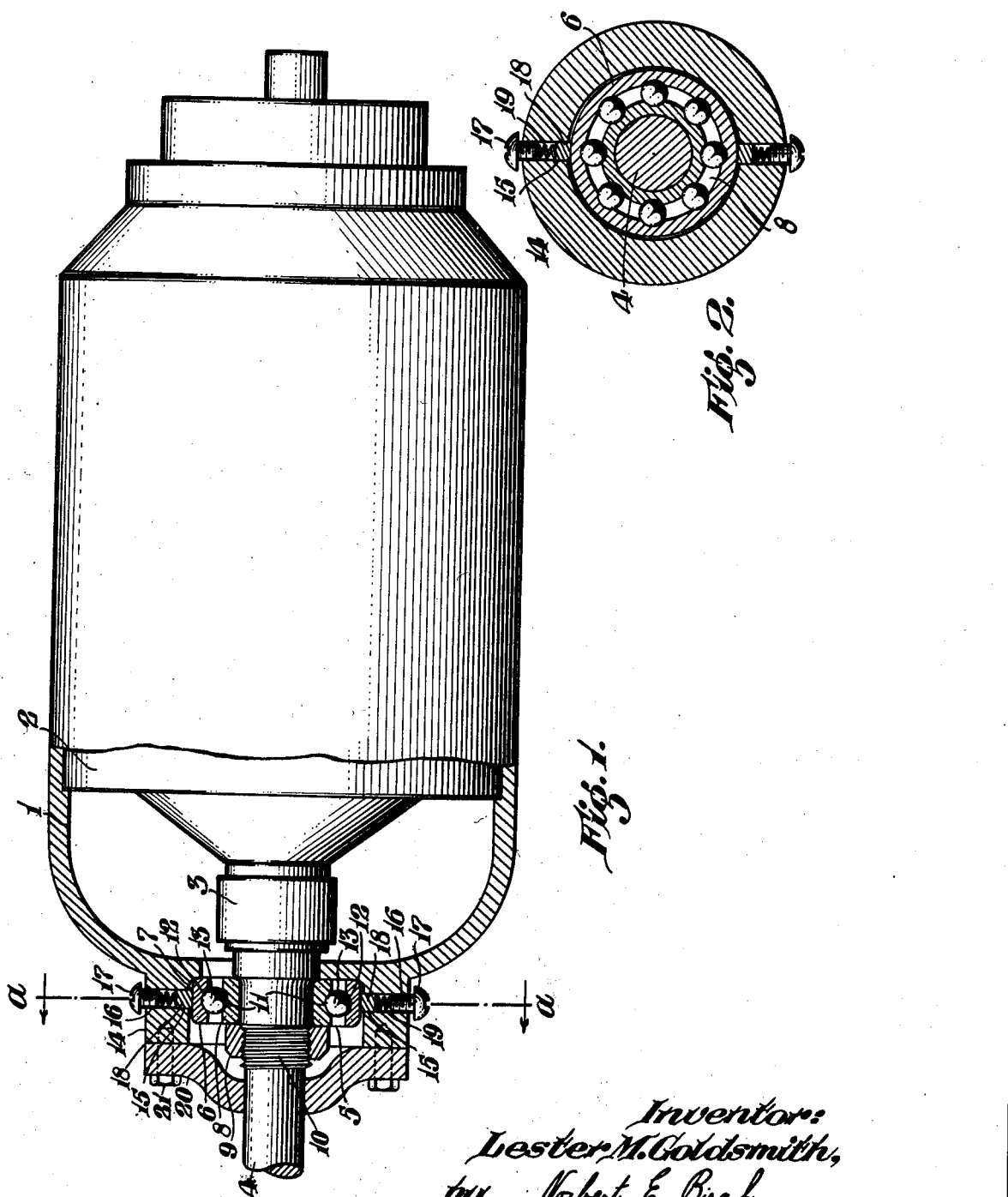
Inventor:
Lester M. Goldsmith,
by Norbert E. Birch
Attorney:

Patented Jan. 27, 1942

2,271,336

UNITED STATES PATENT OFFICE 2,271,336

BEARING MOUNTING

Lester M. Goldsmith, Philadelphia, Pa., assignor to The Atlantic Refining Company, Philadelphia, Pa., a corporation of Pennsylvania Application November 27, 1940, Serial No. 367,359

6 Claims. (Cl. 308—236)

The present invention relates to improvements in bearing mountings, and more particularly to means for preventing a bearing from rotating in a bearing housing, while permitting limited motion of the bearing in the direction of the axis of the shaft accommodated by such bearing, notwithstanding normal diametral expansion of the bearing.

In accordance with the existing practice regarding the mounting of rotating shafts in ball bearings having an inner and outer race, the rotor shaft of an electric motor being a convenient example, the outer race of one bearing is held rigid in the bearing housing into which it is ordinarily pressed or forced, while the other bearing is left free to slide, i. e., in the direction of the axis of the shaft, to take up axial expansion and contraction of the shaft, the outer race having a sliding fit in the seat or housing. In such cases, it is apparent that the radial clearance between the outside diameter of the latter bearing and the housing in which it slides must be such that when the bearing expands diametrically, due to an increase in temperature in the bearing, movement of the bearing in an axial direction can still take place. Under such design conditions it is difficult to prevent rotation of the outer bearing race in the housing.

It is therefore an object of the present invention to provide an improved means for holding a bearing race against rotation in a housing, while permitting longitudinal motion of the bearing sufficient to take care of expansion and contraction of the shaft accommodated by the bearing, and diametral expansion of the bearing race.

A further object of this invention is to provide a bearing-holding means which permits ready and easy insertion or removal of ball bearings, as necessity requires.

A further object of this invention is the utilization of standard motor or bearing housings, whereby the bearing-retaining means of the present invention may be incorporated in newly manufactured motors or in old motors now in use, without substantial alteration of the standard motor housings.

In accordance with my invention, the outer race of the ball bearing is held stationary in the bearing seat by one or more permanent magnets engaging the outer race at points suitably spaced along its circumference. The attractive force exerted by the magnet or magnets is sufficient to prevent rotation of the outer race, while at the same time permitting diametral expansion of the outer race, and limited motion thereof in the direction of the axis of the shaft, thereby to take up expansion and contraction of the shaft and eliminate any tendency to cramp the bearings.

My invention will be further understood with reference to the accompanying drawing in which:

Figure 1 is an elevation partly in section of a motor housing equipped with means for holding the outer bearing race against rotation.

Figure 2 is a section taken along the line A—A of Figure 1.

Referring to the drawing, in which like parts are similarly numbered, the construction shown comprises a motor housing 1, enclosing the motor 2 having a rotor 3 mounted on shaft 4, one end of which is supported in ball bearing 5. The bearing 5 has its outer race 6 mounted to slide in the seat 7 in the direction of the axis of the shaft 4 as its temperature rises or falls, it being understood that in accordance with the usual practice the inner race 8 is secured to shaft 4, for example, by a retaining ring or nut 9 affixed to the threaded portion 10 of shaft 4. The inner and outer races are provided with registering grooves 11 and 12, respectively, in which the balls 13 provide a connection between the inner and outer races and the shaft 4, causing the bearing to move or tend to move back and forth in the direction of the axis of the shaft as the latter expands or contracts with change in temperature.

In accordance with the construction shown, the seat 7 for the sliding or floating bearing 5 is formed in a housing or boss 14 which is integral with the motor housing 1. Such seat may be made slightly oversize in order to permit expansion of the bearing diametrically, thereby avoiding seizure of the bearing in the seat upon increase in temperature.

The bearing housing or boss 14 is drilled or bored radially in any suitable manner at 15 with one or more holes extending from the outside of the housing 14 into the seat 7, there being two such holes 15 in the form of the invention shown, approximately 180° apart. These holes are suitably threaded at 16 to accommodate screws 17. In each hole is disposed a cylindrical magnet 18, preferably constructed of a powerful magnetic material such as "Alnico." These magnets are urged into contact with the periphery of the outer bearing race 6 by means of small coil springs 19 retained in the holes 15 by screws 17, this means of maintaining said contact permitting diametral expansion of the bearing race in the housing. Compression of the springs may be regulated by the depth to which the screws are seated. The force exerted by these magnets is sufficient to hold the outer bearing race substantially stationary, thereby preventing the race from rotating and damaging either the bearing or the bearing housing. The bearing housing 14 may be suitably enclosed by means of a cover plate 20 attached to the face of the housing by a plurality of bolts 21.

In the embodiment of my invention above described, I have shown the use of two cylindrical magnets for holding the outer bearing race stationary. It is to be understood, however, that I may utilize any number of magnets that may be necessary to accomplish the desired purpose, depending upon the size of the motor and/or bearings. Furthermore, it is not necessary that the magnets be cylindrical in form, since square magnets or magnets of arcuate form may be suitably employed.

I have thus described specifically and in detail a bearing-retainer particularly adapted for use with ball bearings, embodying the features of my invention in the preferred form, in order that the manner of constructing, applying and using the invention may be fully understood. However, the specific terms herein are used descriptively rather than in a limiting sense, the scope of the invention being defined in the appended claims.

What I claim is:

1. In combination with a bearing housing having a bearing slidably mounted therein, magnetic means disposed within said housing in engagement with said bearing to prevent rotation of said bearing while permitting diametral expansion of the bearing and limited motion of the bearing in the direction of the axis of the bearing.

2. In combination with a bearing housing having a bearing slidably mounted therein, magnetic means disposed within said housing in spring tensioned engagement with said bearing to prevent rotation of said bearing while permitting diametral expansion of the bearing and limited motion of the bearing in the direction of the axis of the bearing.

3. The combination with a ball bearing for a rotatable shaft, said ball bearing having an inner and outer race with registering grooves and balls therein, of a housing for the outer race in which it is slidably mounted and in which it is rotatable, and magnetic means disposed in said housing and contacting said outer race to prevent rotation of said outer race while permitting diametral expansion and limited motion thereof in the direction of the axis of said shaft.

4. The combination with a ball bearing for a rotatable shaft, said ball bearing having an inner and outer race with registering grooves and balls therein, of a housing for the outer race in which it is slidably mounted and in which it is rotatable, and a magnet disposed in said housing and contacting said outer race to prevent rotation of said outer race while permitting diametral expansion and limited motion thereof in the direction of the axis of said shaft.

5. The combination with a ball bearing for a rotatable shaft, said ball bearing having an inner and an outer race with registering grooves and balls therein, of a housing for the outer race in which it is slidably mounted and in which it is rotatable, and means associated with said housing to prevent rotation of said outer race while permitting diametral expansion and limited motion thereof in the direction of the axis of said shaft, said means comprising at least one radial bore extending through the wall of said housing, a magnet slidably disposed in said bore and contacting said outer race, and means for retaining said magnet in said bore.

6. The combination with a ball bearing for a rotatable shaft, said ball bearing having an inner and an outer race with registering grooves and balls therein, of a housing for the outer race in which it is slidably mounted and in which it is rotatable, and means associated with said housing to prevent rotation of said outer race while permitting diametral expansion and limited motion thereof in the direction of the axis of said shaft, said means comprising at least one radial bore extending through the walls of said housing, a magnet slidably disposed in said bore, a spring urging said magnet into contact with said outer race, and a screw for adjusting the compression of said spring.

LESTER M. GOLDSMITH.